(12) United States Patent
Jackson

(10) Patent No.: US 9,495,222 B1
(45) Date of Patent: Nov. 15, 2016

(54) SYSTEMS AND METHODS FOR PERFORMANCE INDEXING

(75) Inventor: Philip Eric Jackson, Boston, MA (US)

(73) Assignee: Dell Software Inc., Aliso Viejo, CA (US)

( * ) Notice: Subject to any disclaimer, the term of this patent is extended or adjusted under 35 U.S.C. 154(b) by 351 days.

(21) Appl. No.: 13/594,431

(22) Filed: Aug. 24, 2012

Related U.S. Application Data

(60) Provisional application No. 61/527,952, filed on Aug. 26, 2011.

(51) Int. Cl.
*G06F 9/46* (2006.01)
*G06F 9/52* (2006.01)

(52) U.S. Cl.
CPC ....................... *G06F 9/52* (2013.01)

(58) Field of Classification Search
None
See application file for complete search history.

(56) References Cited

U.S. PATENT DOCUMENTS

| | | | |
|---|---|---|---|
| 5,495,610 | A | 2/1996 | Shing et al. |
| 6,311,321 | B1 | 10/2001 | Agnihotri et al. |
| 6,434,613 | B1 | 8/2002 | Bertram et al. |
| 6,449,688 | B1 | 9/2002 | Peters et al. |
| 6,457,143 | B1 | 9/2002 | Yue |
| 6,496,568 | B1 * | 12/2002 | Nelson .................. 379/88.12 |
| 6,757,371 | B2 | 6/2004 | Kim et al. |
| 6,785,768 | B2 | 8/2004 | Peters et al. |
| 6,854,009 | B1 * | 2/2005 | Hughes .................. 709/220 |
| 7,010,493 | B2 | 3/2006 | Yamamoto et al. |
| 7,024,517 | B1 * | 4/2006 | Zahavi .................. 711/114 |
| 7,069,234 | B1 * | 6/2006 | Cornelius et al. ........ 705/80 |
| 7,100,195 | B1 * | 8/2006 | Underwood ................ 726/2 |
| 7,111,297 | B1 | 9/2006 | Sankaranarayan et al. |
| 7,167,844 | B1 * | 1/2007 | Leong et al. .............. 705/80 |
| 7,290,259 | B2 | 10/2007 | Tanaka et al. |
| 7,320,131 | B1 | 1/2008 | O'Toole, Jr. |
| 7,412,492 | B1 | 8/2008 | Waldspurger |

(Continued)

FOREIGN PATENT DOCUMENTS

| | | |
|---|---|---|
| CA | 2792227 A1 | 5/2004 |
| WO | WO 2009/048609 A1 | 4/2009 |
| WO | WO 2009/108344 A1 | 9/2009 |

OTHER PUBLICATIONS

IBM, "IBM Tivoli Service Level Advisor Administrator's Guide", Version 2.1, Sep. 2004.

(Continued)

*Primary Examiner* — Emerson Puente
*Assistant Examiner* — Mehran Kamran
(74) *Attorney, Agent, or Firm* — Winstead PC

(57) ABSTRACT

Systems and methods relate to indexing of performance and cost of workloads in a computing environment. The computing environment may include a virtualized computing environment. According to some embodiments, a performance index relating to a plurality of workloads executing in the computing environment may be generated, where the performance index is based at least in part on performance and cost of use of one or more resources in the computing environment by the plurality of workloads. The index may be normalized. If the performance or cost of a particular workload departs from an expected performance or cost determined from the average performance and/or cost in the computing environment, resources may be reallocated to the workloads such that the performance or cost of the workload is closer to its expected performance or cost based on the performance index.

15 Claims, 13 Drawing Sheets

(56) References Cited

U.S. PATENT DOCUMENTS

| | | | |
|---|---|---|---|
| 7,412,709 B2 | 8/2008 | Branson et al. | |
| 7,430,692 B2 | 9/2008 | White, III et al. | |
| 7,689,676 B2 | 3/2010 | Vinberg et al. | |
| 7,757,214 B1 | 7/2010 | Palczak et al. | |
| 7,761,875 B2* | 7/2010 | Karamanolis et al. | 718/102 |
| 7,792,931 B2 | 9/2010 | Vinberg et al. | |
| 8,127,291 B2 | 2/2012 | Pike et al. | |
| 8,209,687 B2 | 6/2012 | Yuyitung et al. | |
| 8,255,906 B2 | 8/2012 | Ding et al. | |
| 8,291,411 B2 | 10/2012 | Beaty et al. | |
| 8,320,256 B2 | 11/2012 | Temple, III | |
| 8,738,972 B1 | 5/2014 | Bakman et al. | |
| 2002/0128029 A1 | 9/2002 | Nishikawa et al. | |
| 2002/0129082 A1 | 9/2002 | Baskey et al. | |
| 2002/0133757 A1 | 9/2002 | Bertram et al. | |
| 2002/0165963 A1 | 11/2002 | Baxley et al. | |
| 2002/0188576 A1 | 12/2002 | Peterson et al. | |
| 2003/0005108 A1 | 1/2003 | Bartley et al. | |
| 2003/0028440 A1 | 2/2003 | Allen et al. | |
| 2003/0046396 A1 | 3/2003 | Richter et al. | |
| 2003/0110421 A1* | 6/2003 | Kurinami et al. | 714/47 |
| 2003/0169863 A1 | 9/2003 | Hernandez et al. | |
| 2003/0171907 A1* | 9/2003 | Gal-On et al. | 703/14 |
| 2004/0117311 A1 | 6/2004 | Agarwal et al. | |
| 2004/0139037 A1 | 7/2004 | Paleologo | |
| 2004/0143664 A1 | 7/2004 | Usa et al. | |
| 2004/0221285 A1 | 11/2004 | Donovan et al. | |
| 2004/0249763 A1 | 12/2004 | Vardi | |
| 2005/0010502 A1 | 1/2005 | Birkestrand et al. | |
| 2005/0010930 A1* | 1/2005 | Vaught | 719/318 |
| 2005/0038833 A1* | 2/2005 | Colrain et al. | 707/203 |
| 2005/0086331 A1* | 4/2005 | Wadia et al. | 709/221 |
| 2005/0091399 A1* | 4/2005 | Candan et al. | 709/238 |
| 2005/0120160 A1 | 6/2005 | Plouffe et al. | |
| 2005/0138168 A1 | 6/2005 | Hoffman et al. | |
| 2005/0144025 A1 | 6/2005 | Katz et al. | |
| 2005/0187950 A1* | 8/2005 | Parker et al. | 707/100 |
| 2005/0193269 A1* | 9/2005 | Haswell et al. | 714/38 |
| 2005/0240668 A1* | 10/2005 | Rolia et al. | 709/223 |
| 2005/0256946 A1 | 11/2005 | Childress et al. | |
| 2005/0278453 A1* | 12/2005 | Cherkasova | 709/231 |
| 2006/0025985 A1 | 2/2006 | Vinberg et al. | |
| 2006/0031248 A1 | 2/2006 | Vinberg et al. | |
| 2006/0037002 A1 | 2/2006 | Vinberg et al. | |
| 2006/0059492 A1* | 3/2006 | Fellenstein et al. | 718/104 |
| 2006/0161884 A1* | 7/2006 | Lubrecht et al. | 717/104 |
| 2006/0190482 A1 | 8/2006 | Kishan et al. | |
| 2006/0265711 A1 | 11/2006 | Bantz et al. | |
| 2006/0288348 A1 | 12/2006 | Kawamoto et al. | |
| 2007/0011092 A1 | 1/2007 | Bishop et al. | |
| 2007/0043860 A1 | 2/2007 | Pabari | |
| 2007/0130236 A1 | 6/2007 | Seeger et al. | |
| 2007/0168494 A1* | 7/2007 | Liu et al. | 709/224 |
| 2007/0271560 A1 | 11/2007 | Wahlert et al. | |
| 2007/0271570 A1* | 11/2007 | Brown et al. | 718/105 |
| 2008/0052206 A1 | 2/2008 | Edwards et al. | |
| 2008/0059214 A1 | 3/2008 | Vinberg et al. | |
| 2008/0071905 A1* | 3/2008 | Sullivan et al. | 709/224 |
| 2008/0082983 A1* | 4/2008 | Groetzner et al. | 718/105 |
| 2008/0086731 A1 | 4/2008 | Trossman et al. | |
| 2008/0126547 A1 | 5/2008 | Waldspurger | |
| 2008/0133777 A1 | 6/2008 | Wilkinson | |
| 2008/0172673 A1 | 7/2008 | Naik | |
| 2008/0189468 A1 | 8/2008 | Schmidt et al. | |
| 2008/0189700 A1 | 8/2008 | Schmidt et al. | |
| 2008/0216175 A1 | 9/2008 | Pike | |
| 2008/0295096 A1 | 11/2008 | Beaty et al. | |
| 2009/0013157 A1 | 1/2009 | Beaule | |
| 2009/0055834 A1 | 2/2009 | Ding et al. | |
| 2009/0070771 A1 | 3/2009 | Yuyitung et al. | |
| 2009/0100370 A1* | 4/2009 | Martone et al. | 715/777 |
| 2009/0164356 A1 | 6/2009 | Bakman | |
| 2009/0287571 A1 | 11/2009 | Fujioka | |
| 2009/0300173 A1 | 12/2009 | Bakman et al. | |
| 2009/0300409 A1* | 12/2009 | Bates et al. | 714/5 |
| 2009/0307597 A1 | 12/2009 | Bakman | |
| 2010/0049851 A1* | 2/2010 | Garrison et al. | 709/226 |
| 2010/0091664 A1* | 4/2010 | Nandy et al. | 370/242 |
| 2010/0162200 A1* | 6/2010 | Kamiyama et al. | 717/101 |
| 2010/0180275 A1* | 7/2010 | Neogi et al. | 718/1 |
| 2010/0306163 A1* | 12/2010 | Beaty et al. | 706/52 |
| 2011/0004885 A1* | 1/2011 | Kikuchi et al. | 718/104 |
| 2011/0035752 A1* | 2/2011 | Krishnakumar et al. | 718/103 |
| 2011/0125895 A1* | 5/2011 | Anderson et al. | 709/224 |
| 2011/0149737 A1* | 6/2011 | Muthiah et al. | 370/235 |
| 2011/0167424 A1* | 7/2011 | Murthy et al. | 718/102 |
| 2011/0276784 A1* | 11/2011 | Gewirtz et al. | 712/205 |
| 2011/0283283 A1* | 11/2011 | Kuno et al. | 718/101 |
| 2012/0072781 A1* | 3/2012 | Kini et al. | 714/47.3 |
| 2012/0167101 A1* | 6/2012 | Kandula et al. | 718/102 |
| 2012/0246646 A1 | 9/2012 | Bakman | |
| 2012/0260248 A1* | 10/2012 | Katiyar et al. | 718/1 |
| 2012/0284713 A1* | 11/2012 | Ostermeyer et al. | 718/1 |
| 2012/0297385 A1* | 11/2012 | Arlitt et al. | 718/100 |
| 2013/0013248 A1* | 1/2013 | Brugler et al. | 702/130 |
| 2013/0218547 A1 | 8/2013 | Ostermeyer et al. | |
| 2013/0239112 A1* | 9/2013 | Kato et al. | 718/1 |
| 2013/0275382 A1* | 10/2013 | Chi et al. | 707/654 |
| 2014/0032768 A1* | 1/2014 | Ding et al. | 709/226 |
| 2014/0181833 A1* | 6/2014 | Bird et al. | 718/105 |

OTHER PUBLICATIONS

International Preliminary Report and Written Opinion for PCT/US08/11639, mailed Dec. 18, 2008 (9 pages).

International Preliminary Report and Written Opinion for PCT/US09/01237, mailed Jun. 3, 2009 (12 pages).

International Search Report for PCT/US08/11639, mailed Dec. 18, 2008 (1 page).

International Search Report for PCT/US09/01237, mailed Jun. 3, 2009 (2 pages).

Agarwala, Sandip, et al., "ChargeView: An Integrated Tool for Implementing Chargeback in IT Systems", Apr. 2008, 8 pages.

"The Effects of Charge-Back Policies"; EDP Analyzer, vol. 11, No. 11; Nov. 1973; 14 pages.

\* cited by examiner

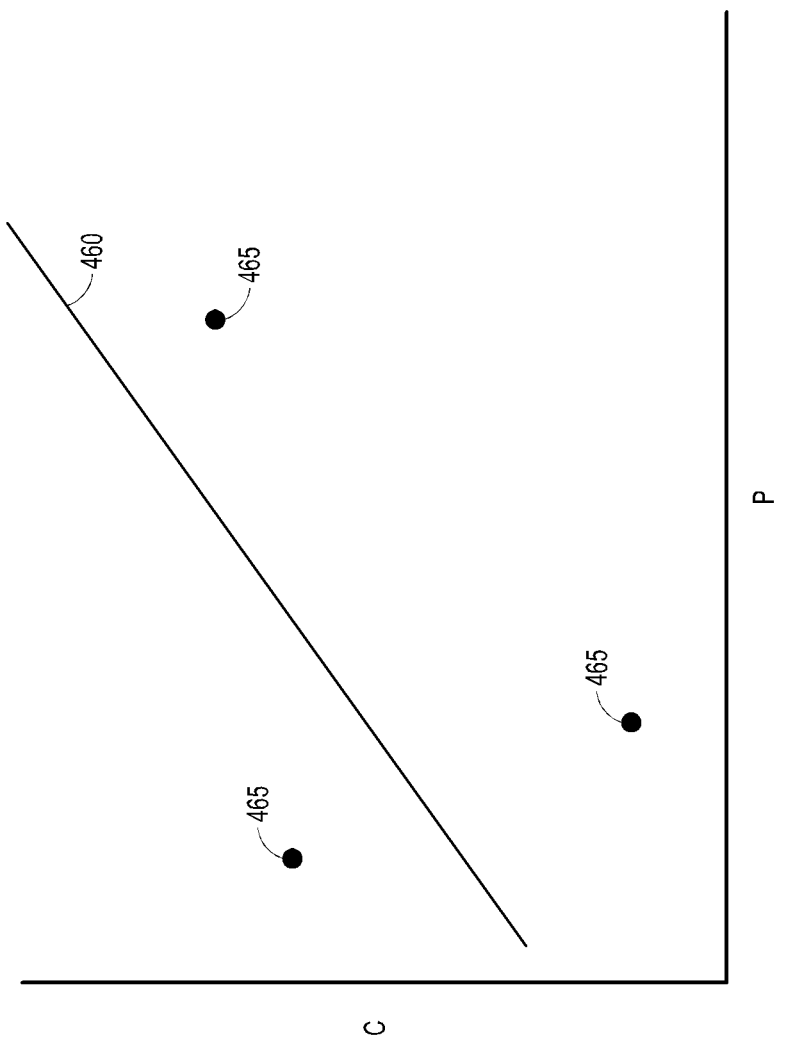

SYSTEMS AND METHODS FOR PERFORMANCE INDEXING

CROSS-REFERENCE TO RELATED APPLICATIONS

This application claims the benefit of priority under 35 U.S.C. §119(e) of U.S. Patent Application No. 61/527,952, filed Aug. 26, 2011, entitled "SYSTEMS AND METHODS FOR NORMALIZED PERFORMANCE INDEXING," the entirety of which is hereby incorporated by reference herein so as to form part of this specification.

FIELD OF THE DISCLOSURE

The present disclosure generally relates to performance indexing of computing infrastructures. In particular, the present disclosure provides examples of systems and methods for determining a price and/or performance index for computing infrastructures.

BACKGROUND

Conventionally, information technology (hereinafter "IT") organizations consolidate physical servers into a smaller set of physical servers running many virtual servers. In this virtual server environment, some or all hardware resources, such as memory (e.g., random access memory or RAM), central processing unit (CPU), storage and network are shared among the virtual servers. Many organizations are reducing the number of physical servers through virtualization technologies which allow for multiple virtual servers to run on one or more physical servers. With consolidation of servers it is likely that capacity bottlenecks will develop in sharing or resources such as CPU, RAM, and storage. That is, if the shared resources are over-utilized, users can experience performance degradation and even downtime.

SUMMARY

A computer system for normalized indexing of performance and cost of workloads in a virtualized computing environment includes computer hardware including a computer processor and a performance manager. The performance manager includes instructions executable by the computer processor to cause the computer hardware to access information relating to a plurality of workloads executing in a virtualized computing environment comprising one or more resources. Each of the plurality of workloads includes at least one of an application, a service, a process, a task, a thread, a script, or a virtual machine, and the one or more resources include allocation, availability, or capacity of at least one of CPU, memory, storage, or network. The performance manager is further configured to generate a normalized performance index relating to the plurality of workloads. The normalized performance index is based at least in part on performance and cost of the one or more resources in the virtualized computing environment used by the plurality of workloads. The performance manager is further configured to determine whether performance or cost of a first workload in the plurality of workloads departs from an expected performance or cost based on the normalized performance index. In response to a determination that the performance or cost of the first workload departs from the expected performance or cost, the performance manager is further configured to reallocate the one or more resources to the plurality of workloads in the virtualized computing environment such that the performance or cost of the first workload is closer to the expected performance or cost based on the normalized performance index.

A method for indexing of performance and cost of workloads in a virtualized computing environment includes, under control of a performance management system comprising non-transitory data storage and physical computer processors, accessing information relating to a plurality of workloads executing in a virtualized computing environment comprising computing resources. The method further includes generating a performance index relating to the plurality of workloads. The performance index is based at least in part on performance and cost of the computing resources in the virtualized computing environment used by the plurality of workloads. The method further includes determining whether performance or cost of a first workload in the plurality of workloads departs from an expected performance or cost based on the performance index. The method further includes taking a corrective action, in response to a determination that the performance or cost of the first workload departs from the expected performance or cost, such that the performance or cost of the first workload is closer to the expected performance or cost based on the performance index.

Non-transitory computer storage includes instructions stored on the storage that cause a computer system having computer storage to perform some operations when executed by the computer system. The operations include accessing a performance index relating to a plurality of workloads executing in a computing environment. The performance index is based at least in part on performance and cost of computing resources in the computing environment used by the plurality of workloads. The operations also include evaluating whether a first workload in the plurality of workloads is out of balance relative to the performance index. The operations include taking a corrective action, in response to an evaluation that the first workload is out of balance, such that the performance or cost of the first workload moves closer to balance based on the performance index.

The details of various embodiments of the disclosure are set forth in the accompanying drawings and the description herein.

BRIEF DESCRIPTION OF THE FIGURES

The foregoing and other objects, aspects, features, and advantages of the disclosure will become more apparent and better understood by referring to the following description taken in conjunction with the accompanying drawings, in which:

FIGS. 4B to 4D are diagrams of example graphs associated with an example price performance index;

Figure 1:
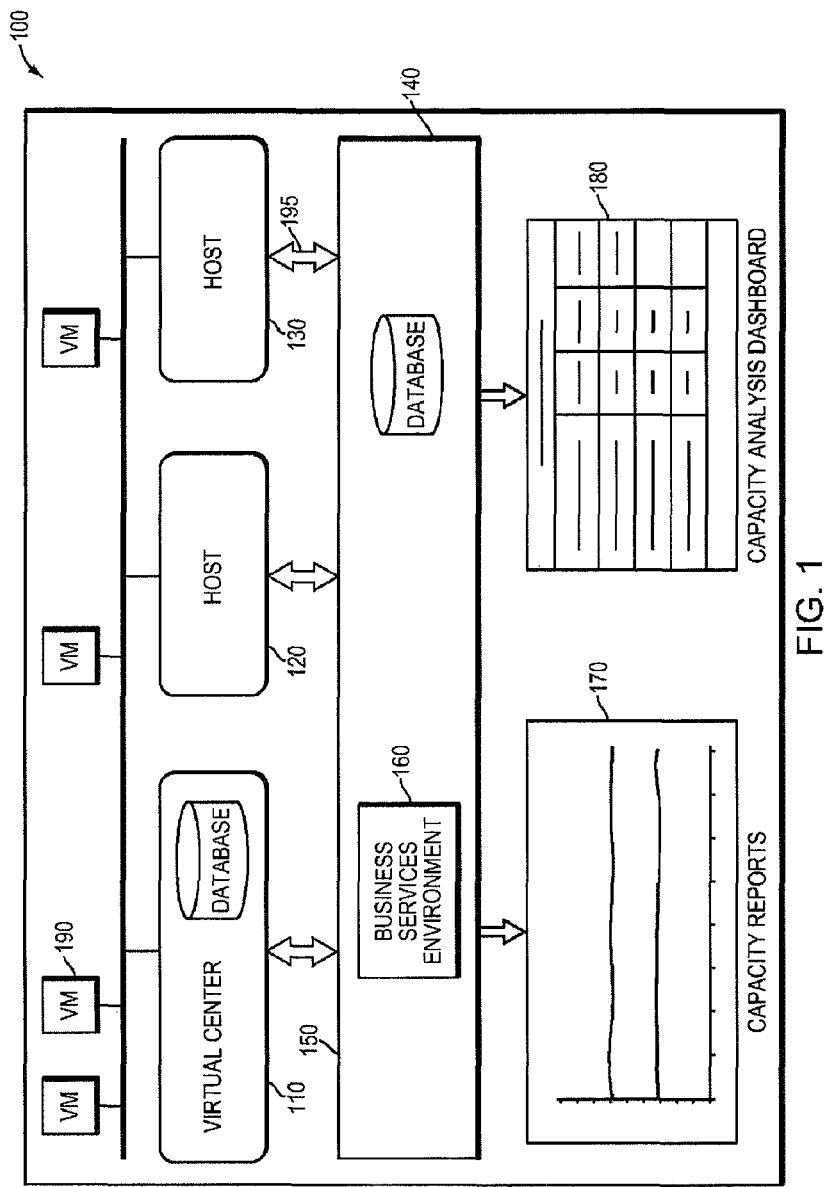
FIGS. 1-3 and 3A are block diagrams of embodiments of an architecture associated with systems and methods for monitoring computing resources and performing impact analysis and optimization in the management of virtual machines (VMs)

The features and advantages of the present disclosure will become more apparent from the detailed description set forth below when taken in conjunction with the drawings, in which like reference characters identify corresponding elements throughout and generally indicate identical, functionally similar, and/or structurally similar elements.

DETAILED DESCRIPTION

The matters exemplified in this description are provided to assist in the understanding of example embodiments of the present disclosure described with reference to the accompanying drawing figures. Accordingly, those of ordinary skill in the art will recognize that various changes and modifications of the example embodiments described herein can be made without departing from the scope and spirit of the present disclosure. Also, descriptions of well-known functions and constructions may be omitted for conciseness. Likewise, certain naming conventions, labels and terms as used in the context of the present disclosure are, as would be understood by skilled artisans, non-limiting and provided only for illustrative purposes to facilitate understanding of certain example implementations of the embodiments of the present disclosure.

Overview

A number of trends, including the need to continually extract cost advantage from virtualization while converting increasingly critical workloads, the transformation of the cloud from hype to reality, and the appearance of real choice in hypervisors have collectively made the question of how to best balance price and performance increasingly important. Some existing solutions for performance monitoring and management, capacity management, and chargeback do a poor job of supporting organizations in addressing these, as well as other, issues.

From a price and/or performance perspective, certain embodiments of the present disclosure may consider, address or help support some or all of the following aspects of performance monitoring and management, capacity management, and chargeback:

i) Infrastructure Cost Comparison: What would workloads cost if they were executed on a different part of the infrastructure, a different hypervisor, etc.?

ii) Best Placement: Where should an existing workload be moved to get the required or desired performance at the best price? Where should a planned workload be deployed to get the required or desired performance at the best price?

iii) Overall Price and/or Performance Effectiveness: Is an entity getting the most effective use of its infrastructure from a price and/or performance perspective, or is the entity paying more than it may need to run its current workloads?

iv) Service Level Agreement (SLA) Establishment: How can performance tiers be effectively created from an infrastructure perspective under shared resource conditions?

v) SLA Alignment: Is the performance of a virtual machine (VM) in line with the SLA? Is the VM meeting SLA requirements or goals? Is the VM getting more than it should?

Using various embodiments of the systems and methods of price and/or performance indexing described herein, the present disclosure provides functionality and a foundation for some or all of the above aspects. Embodiments of the present disclosure provide an index generally referred to as a Price Performance Delta Index (PPDI) that may be used to ensure a more optimal price and/or performance balance for workloads in an existing environment. Embodiments of the present disclosure also provide a map that illustrates an environment-wide view of how an organization is doing on a price and/or performance basis.

In the following, Section A describes embodiments of virtualized environments and computing environments which may be useful for practicing embodiments for normalized indexing, and Section B describes embodiments of systems and methods for normalized indexing of workloads and resources.

A. Embodiments of System Architecture, Virtualized Environment and Computing Devices Examples of implementations of the present disclosure provide a method, system and apparatus for proactively managing and allocating utilization of shared resources in a virtualized environment on a computer network. Some of the benefits that may be achieved by certain example implementations of system and method according to the present disclosure include, but are not limited to: identifying current capacity bottlenecks causing performance problems; predicting future capacity bottlenecks and facilitating preventive actions; calculating resource availability across hosts, virtual machines, clusters and resource pools; providing information showing exactly where to safely add new virtual machines; tracking the top resource consumers in the virtualized environment; providing an alert when capacity utilization trends exceed thresholds; modeling resource utilization of at least one VM in a computer network; and/or utilizing unused or under-utilized resource of at least one VM in a computer network.

Figure 2:
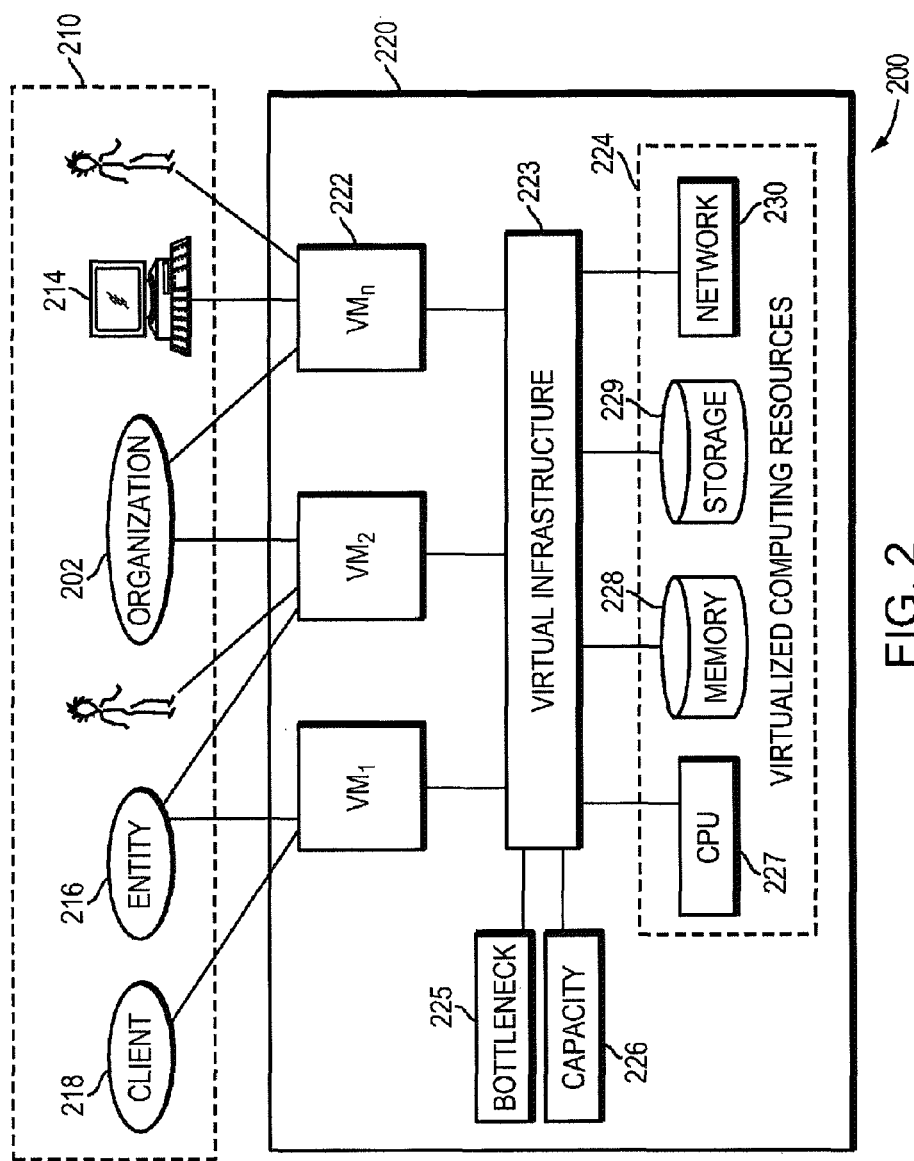
Figure 3:
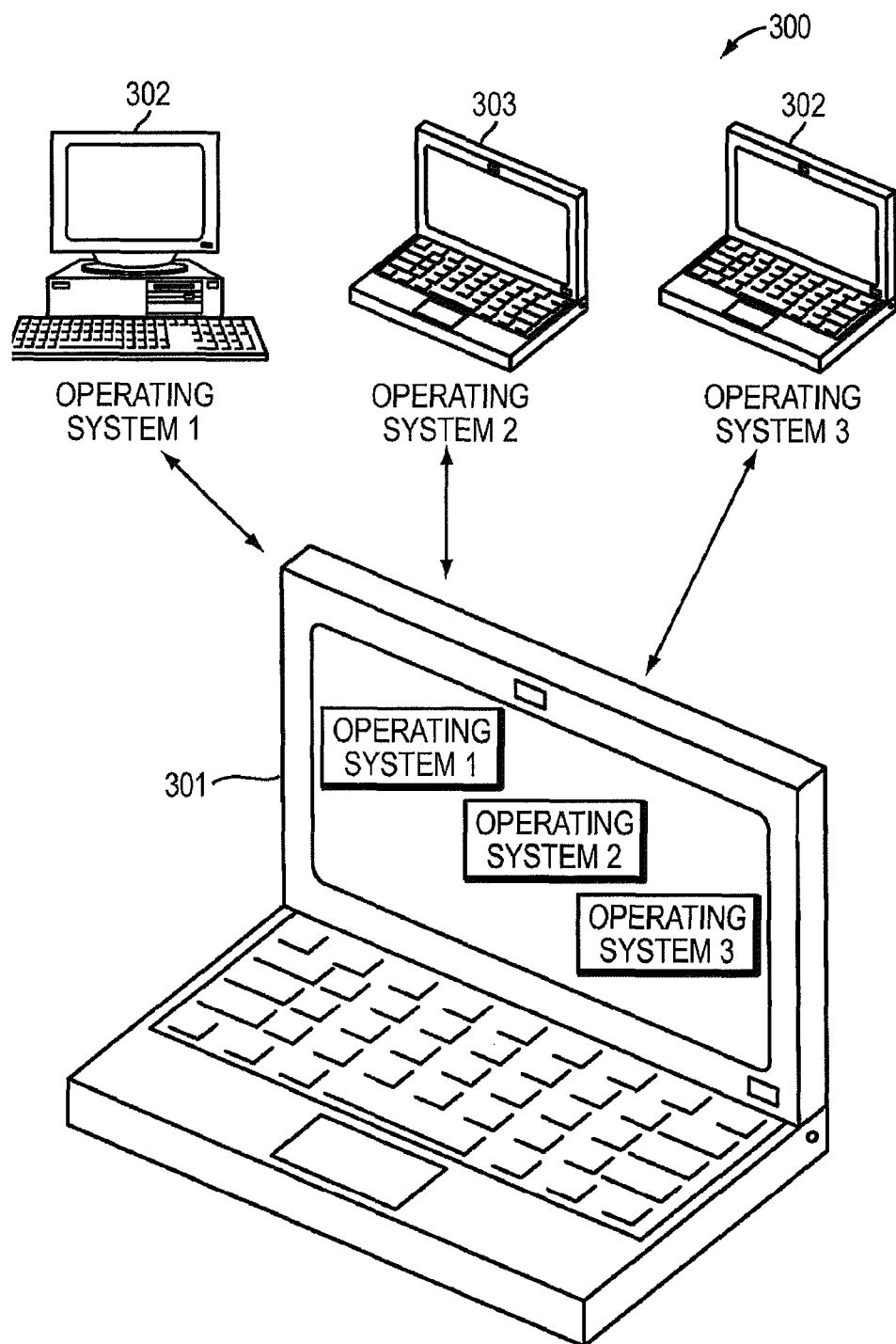

FIGS. 1-3 are schematic block diagrams that illustrate architecture associated with a method, system and apparatus of various embodiments described herein. Embodiments of the methods and processes described, herein, can be performed continuously until terminated or be performed selectively as desired.

Referring to FIG. 1, the embodiment of architecture 100 shows a system for capacity utilization and management 150, where business services 160 in conjunction with a database, relate to 195 various hosts 320, 330 and a virtual center 110, providing services for virtual machines 190. In some embodiments, various reports may be generated for capacity utilization 170 and analysis 180.

Figure 3A:
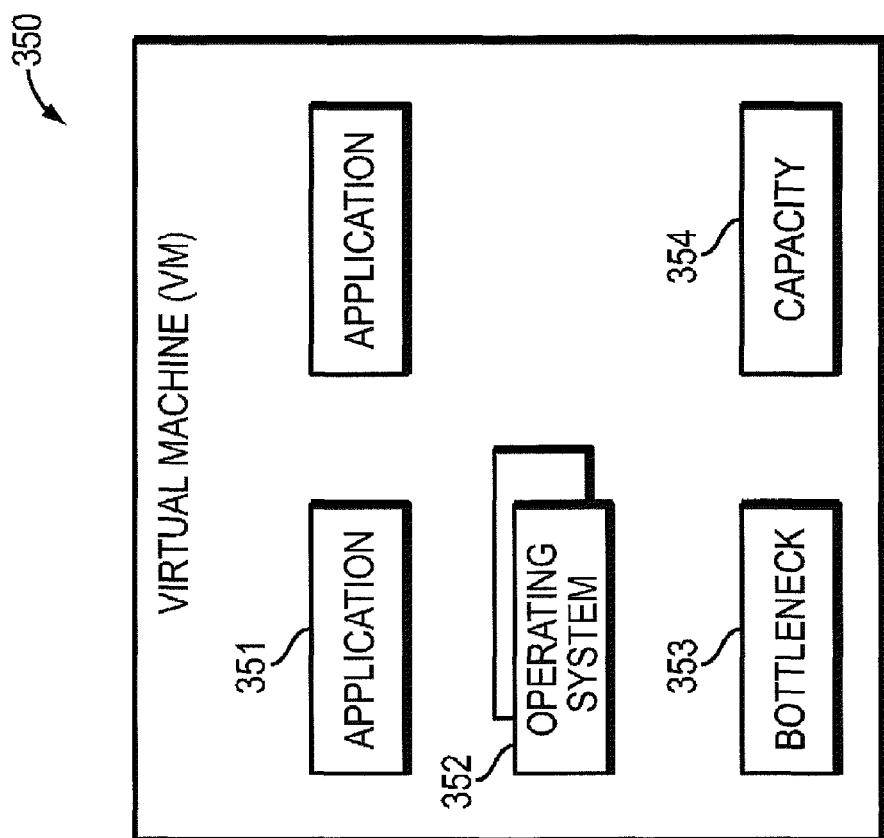

Referring to FIGS. 2, 3 and 3A, embodiments of architectures 200,300 and 350 show that virtualization may provide for one computer 301 doing the job of multiple computers 302, 303, 304, by sharing resources of a single computer 301 across multiple computing environments 302, 303, 304. Virtual servers and virtual desktops may let entities host multiple operating systems 301 and multiple applications locally and in remote locations, freeing them from physical and geographical limitations. This can lead to lower capital expenses due to more efficient use of computing resources, high availability of computing resources, better management of computing resources, increased security and/or improved disaster recover process.

According to embodiments as shown in FIG. 3A, a VM 350 (or VMs 222 in FIG. 2) may be a tightly isolated virtualized module (for example, a folder, a container, and so on) that can run its own operating system and applications as if it were a physical computer. A VM 350 may behave like a physical computer and can be associated with virtualized computing resources 224 (for example, software-based) CPU 227, memory (for example, RAM) 228, storage 229 and network 230 (for example, network interface cards ("NIC")). A VM 351 can be comprised entirely of software with no direct relation to any real hardware. As a result, VMs may offer a number of distinct advantages over physical hardware.

With reference to FIG. 2, in certain embodiments a host server 220 can be configured to host one or more virtual machines executing on top of a virtualization infrastructure 223. The virtualization infrastructure 223 may include one or more partitions (e.g., a parent partition and one or more child partitions) that are configured to include the one or more virtual machines. Further, the virtualization infrastructure may include, for example, a hypervisor that decouples the physical hardware of the host server 220 from the operating systems of the virtual machines. Such abstraction allows, for example, for multiple virtual machines with different operating systems and applications to run in isolation or substantially in isolation on the same physical machine. The hypervisor can also be referred to as a virtual machine monitor (VMM) in some implementations.

The virtualization infrastructure 223 can include a thin piece of software that runs directly on top of the hardware platform of the host server 220 and that virtualizes resources of the machine (e.g., a native or "bare-metal" hypervisor). In such embodiments, the virtual machines can run, with their respective operating systems, on the virtualization infrastructure 223 without the need for a host operating system. Examples of such bare-metal hypervisors can include, but are not limited to, ESX SERVER or vSphere by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), and the like.

In other embodiments, the host server 220 can include a hosted architecture in which the virtualization infrastructure 223 runs within a host operating system environment. In such embodiments, the virtualization infrastructure 223 can rely on the host operating system for device support and/or physical resource management. Examples of hosted virtualization layers can include, but are not limited to, VMWARE WORKSTATION and VMWARE SERVER by VMware, Inc., VIRTUAL SERVER by Microsoft Corporation, PARALLELS WORKSTATION by Parallels, Inc., Kernel-Based Virtual Machine (KVM) (open source), and the like.

Some or all of the virtual machines can include a guest operating system and associated applications. In such embodiments, a virtual machine accesses the resources (e.g., privileged resources) of the host server 220 through the virtualization infrastructure. However, in some implementations, the virtual machines can access at least some of the resources of the host server 220 directly. Users 210 (e.g., clients 218, entities 216, organizations 202, and computing devices 214) can access the VMs 222 (e.g., via a network such as a local area network (LAN), a wide area network (WAN), the Internet, an intranet, combinations of the same, or the like). In certain embodiments, the network can be configured to support secure shell (SSH) tunneling or other secure protocol connections for the transfer of data between the host server 220 and users 210.

According to some embodiments of virtual computing environments, an operating system may not be able to discern the difference between a virtual machine and a physical machine, and in some embodiments, nor can applications or other computers on a network. According to some embodiments, a virtual machine can be a computer application 301 used to create a virtual environment allowing entities to run multiple operating systems 302, 303, 304 at the same time through the use of software located on the computer platform.

Examples of embodiments and implementations of the present disclosure provide methods, systems and apparatuses for managing, modeling, predicting, reserving, allocating and utilizing resources (also referred to as "capacity") in a computer network. The resources may comprise VMs or availability of VMs at a future time. The resources may comprise at least one of a memory, a central processing unit ("CPU"), network, storage and/or Input/Output ("I/O") channels (for example, storage I/O and network I/O) in a computer network.

A VM can be implemented in various different environments and implementations. VMs can be implemented as hardware virtual machine software in relation to utilization and capacity (for example, determining utilization bottleneck information and capacity information). Through the use of the hardware virtual machine software, a user can have a seemingly private machine with fully functional hardware that is separate from the other users. Hardware virtual machine software may allow users to boot and restart their machines quickly since hardware initializations are not necessary According to some embodiments, VMs can also be implemented as application VM software. Application VM software may allow the software application to be isolated from the computer being used. The software may be used on a number of computer platforms. This may make it unnecessary to create separate versions of the same software for different operating systems and computers. According to other implementations, a VM can also be a virtual environment that is used for running programs at the user level for executing applications and not for drivers or operating system kernels.

According to some embodiments, a VM 222 can be a group of computers that work together to create a more powerful machine. These implementations of VMs may make it possible for one environment 200 to be formed throughout several centers (for example, computers, users and/or entities) 101. This may make it appear to the end user as if he or she is using a single computer 301, when they are actually using numerous computers 302, 303, 304.

In some embodiments, the system and methods describe herein may provide the benefit of more improved performance by providing for proactive capacity management and proper allocation of shared resources in a virtual server infrastructure. Additionally, in some embodiments, the systems and methods herein provide for allocating an appropriate amount of resources to avoid bottlenecks in CPU, memory, storage, and disk I/O, providing the benefit of avoiding performance problems and costly downtime events. In some embodiments, the systems and methods described herein also may provide the benefit of avoiding over-allocating resources that can drive up cost per virtual machine—making a Return On Investment harder to achieve. Embodiments of the present systems and methods may provide the benefit of allowing a user to proactively examine various data points on a unique single screen dashboard, continuously. By continuously monitoring shared capacity utilization trends a virtualized environment, implementations of the present description can significantly reduce the time and cost of: a) identifying current capacity bottlenecks causing performance problems; b) predicting where future problems may occur and taking preventative action; c) calculating resources availability across host, clusters, and resource pools, so that it can be discerned, quickly and easily, exactly where to safely add new virtual machines; d) tracking the top resource consumers in a network; and/or e) providing alerts when capacity utilization trends exceed thresholds.

In some embodiments, the systems and methods described herein may utilize mathematic formulas, programs, processes and engines for re-computing and re-displaying all of the data every few seconds or minutes, which provides the benefit of enterprise scalability. In some embodiments, the systems and methods herein may provide means for: preventing current and potential future capacity problems; lowering the risk of performance degradations and downtime events; maximize IT investment by reducing the cost per virtual machine; and/or better manage and plan for a network environment (for example, a virtual environment), saving time and money.

In some embodiments, the systems disclosed may continuously monitor CPU, memory, storage I/O and disk I/O utilization and in real-time identify problems in a virtual environment. Implementations of the systems disclosed may provide critical resource utilization trending data to properly plan for growth, providing improved performance, and lower the cost per virtual machine. In some embodiments, the systems and methods herein may provide: an easy to use single-screen management dashboard; capacity availability maps showing how many more virtual machines can fit in a resource pool, to resolve capacity problems; a user interface to quickly understand the amount of total space and free space available in data-stores; and/or a user interface to view current capacity bottlenecks, where bottlenecks may be color coded and sorted by severity. A trend indicator can show if a problem is getting better or worse. The user interface may show future capacity bottlenecks; immediate identification of what hosts, resource pools or clusters may run out of capacity next and predict the number of days before problems may occur; and/or tracking the top capacity consumers for identifying the biggest resource consumers in the environment.

Figure 3B:
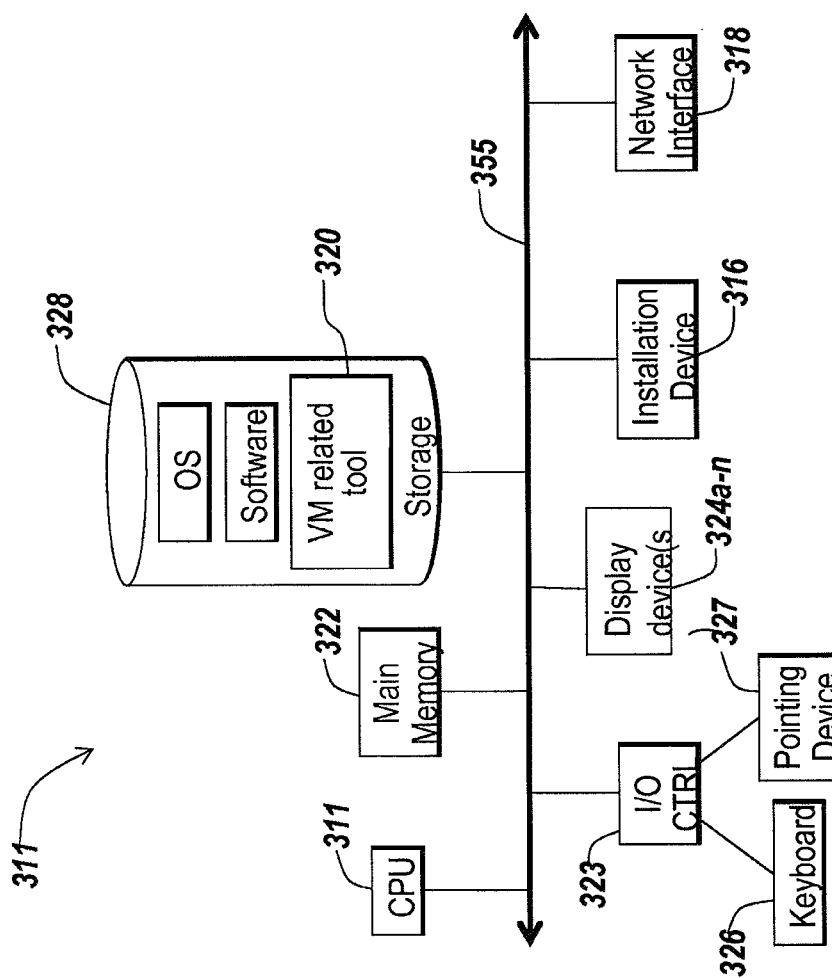
FIGS. 3B and 3C are block diagrams of computing devices useful for practicing embodiments of the systems and methods described herein.
Figure 3C:
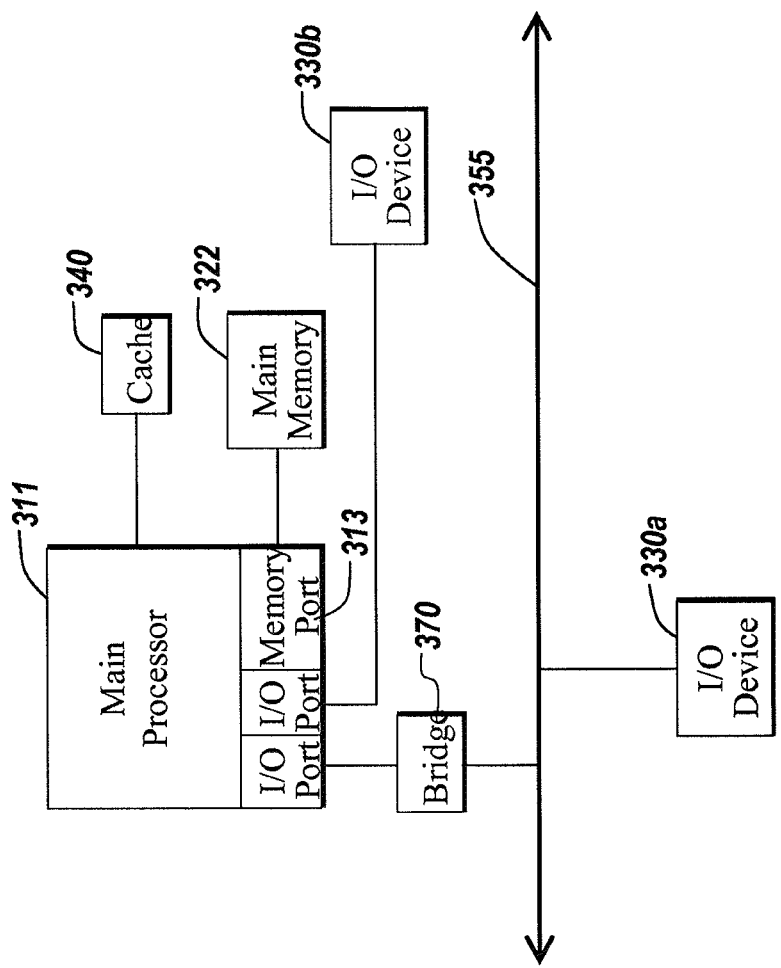

Any portions of the systems described herein may be deployed as and/or executed on any type and form of computing device, such as a computer, network device or hardware appliance capable of communicating on any type and form of network and performing the operations described herein. FIGS. 3B and 3C depict block diagrams of a computing device 300 useful for practicing an embodiment of a device operating a VM or for providing any of VM tools 320 described herein. As shown in FIGS. 3B and 3C, each computing device 300 can include a central processing unit 311, and a main memory unit 322. As shown in FIG. 3B, a computing device 300 may include a visual display device 324, a keyboard 326 and/or a pointing device 327, such as a mouse. Each computing device 300 may also include additional optional elements, such as one or more input/output devices 330a-330b (generally referred to using reference numeral 330), and a cache memory 340 in communication with the central processing unit 311, which can include any logic circuitry that responds to and processes instructions fetched from the main memory unit 322. Main memory unit 322 may include one or more memory devices capable of storing data and allowing any storage location to be directly accessed by the microprocessor 311, such as random access memory (RAM) or non-volatile flash memory. In the embodiment shown in FIG. 3B, the processor 311 communicates with main memory 322 via a system bus 355. FIG. 3C depicts an embodiment of a computing device 300 in which the processor communicates directly with main memory 322 via a memory port 313.

FIG. 3C depicts an embodiment in which the main processor 311 communicates directly with cache memory 340 via a secondary bus, sometimes referred to as a backside bus. In other embodiments, the main processor 311 communicates with cache memory 340 using the system bus 355. Cache memory 340 typically can have a faster response time than main memory 322. FIG. 3C also depicts an embodiment in which local busses and direct communication are mixed: the processor 311 communicates with I/O device 330b using a local interconnect bus while communicating with I/O device 330a directly.

The computing device 300 may support any suitable installation device 316, such as a CD-ROM drive, a CD-R/RW drive, a DVD-ROM drive, tape drives of various formats, USB device, hard-drive or any other device suitable for installing software and programs such as any VM optimization or management tool 320 described herein, or portion thereof. The computing device 300 may further comprise a storage device 328, such as one or more hard disk drives or redundant arrays of independent disks (RAID), for storing an operating system and other related software, and for storing application software programs such as any program related to the client agent 320. Optionally, any of the installation devices 316 could also be used as the storage device 328.

Furthermore, the computing device 300 may include a network interface 318 to interface to a Local Area Network (LAN), Wide Area Network (WAN) or the Internet through a variety of connections including, but not limited to, standard telephone lines, LAN or WAN links, broadband connections, wireless connections, or some combination of any or all of the above. The network interface 318 may comprise a built-in network adapter, network interface card, wireless network adapter, USB network adapter, modem or any other device suitable for interfacing the computing device 300 to any type of network capable of communication and performing the operations described herein.

A wide variety of I/O devices 330a-330n may be present in the computing device 300. Input devices include keyboards, mice, trackpads, trackballs, microphones, and drawing tablets. Output devices include video displays, speakers, or printers. The I/O devices 330 may be controlled by an I/O controller 123 as shown in FIG. 3B. The I/O controller may control one or more I/O devices such as a keyboard 326 and a pointing device 327, e.g., a mouse or optical pen. Furthermore, an I/O device may also provide storage 328 and/or an installation medium 316 for the computing device 300. In still other embodiments, the computing device 300 may provide USB connections to receive handheld USB storage devices.

In some embodiments, the computing device 300 may comprise or be connected to multiple display devices 324a-324n, which each may be of the same or different type and/or form. As such, any of the I/O devices 330a-330n and/or the I/O controller 123 may comprise any type and/or form of suitable hardware, software, or combination of hardware and software to support, enable or provide for the connection and use of multiple display devices 324a-324n by the computing device 300.

The computing device 300 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Embodiments of Systems and Methods for Normalized Indexing

Figure 4A:
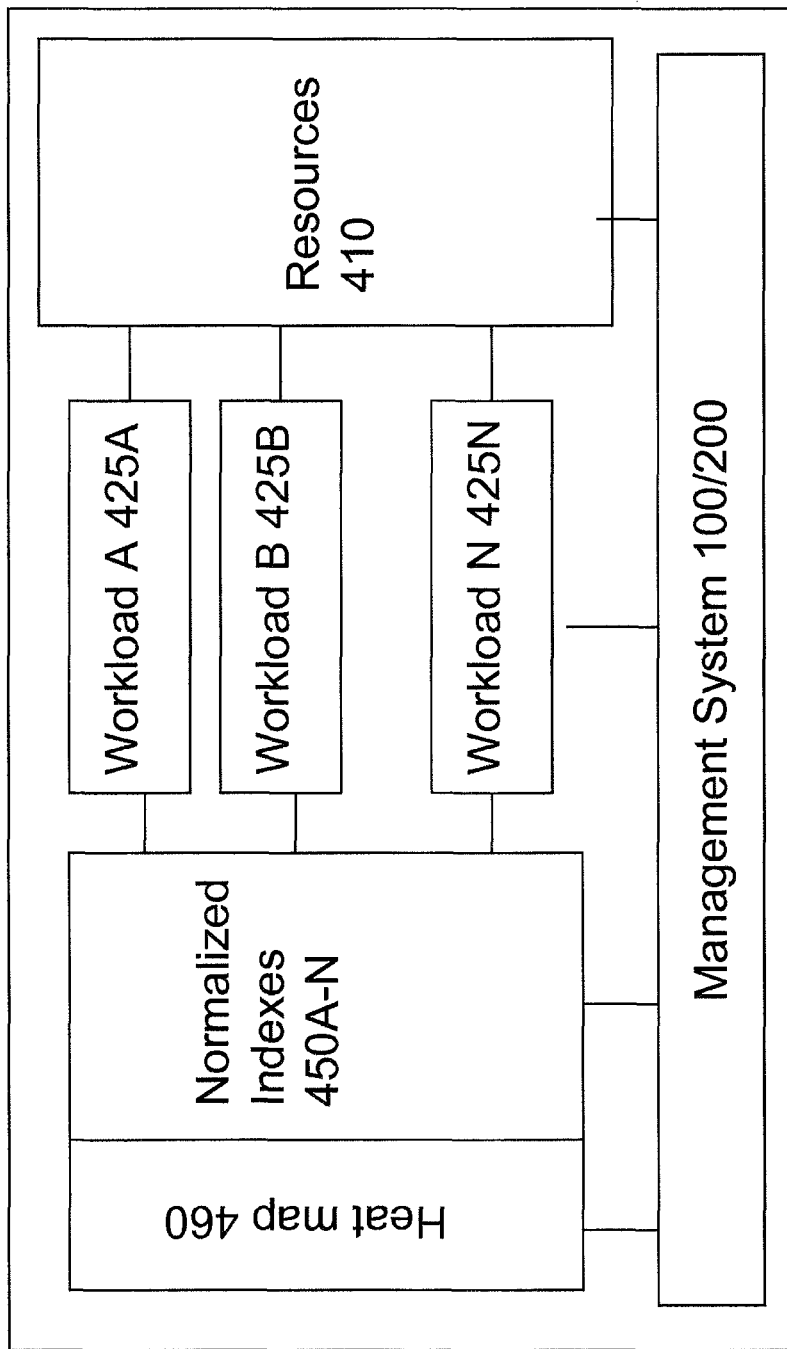
FIG. 4A is a block diagram of an embodiment of an environment for normalized indexing of workloads and resources.

Referring now to FIG. 4A, an embodiment of an environment for indexing of performance and cost of workloads across resources in a computing infrastructure is depicted. In brief overview, the environment or infrastructure 400 may comprise a management system 100/200 (generally referred to as system 100) that performs any type and form of workload and/or resource planning, deployment, performance and capacity management and monitoring. The infrastructure may comprise a plurality of different resources 410, such as CPU, storage, network and memory. These resources may be used by or service a plurality of workloads A-N 425A-425N, generally referred to as workload 425 or workloads 425. A workload may be an application or a virtual machine for example. The system 100 may determine and compute normalized indexes 460 to measure performance and cost of the workloads use of the infrastructure and resources. The system 100 may also generate or provide a heat map of these normalized indexes. Although in many of the examples described herein the index may be a normalized index (for example, scaled in one or more dimensions), this is not a requirement, and in other embodiments the index may be unnormalized.

In further detail, the infrastructure 400 may comprise any type and form of computing and network environment. The infrastructure 400 may comprise a non-virtualized environment. The infrastructure 400 may comprise a virtualized environment. The infrastructure 400 may comprise a combination of virtualized and non-virtualized components. The infrastructure 400 may comprise an entity IT infrastructure, such as one or more data centers, branch office and computing and network devices. The infrastructure 400 may comprise a private computing and network environment. The infrastructure 400 may comprise a public computing and network environment. The infrastructure 400 may comprise a cloud computing and network environment. The infrastructure 400 may comprise a combination of private and public computing and network environment. The infrastructure 400 may comprise any combination of private cloud environments and public cloud environments.

The system 100 may comprise any type and form of application, process, service or task executing on any type and form of device that manages any activity or portion of the IT infrastructure. The system 100 may include any portions of the system 100 or 200 described in connection with FIGS. 1 and 2. The system may include a virtual machine or virtualized system. The system may include logic, function or operations to plan and deploy workloads in the infrastructure. The system may include logic, function or operations to plan, manage, monitor and/or optimize capacity of resources used by workloads in the infrastructure. The system may include logic, function or operations to plan, manage, monitor and/or optimize performance of workloads in the infrastructure. The system may include logic, function or operations to configure, manage, execute, process, compute, use or otherwise provide normalized indexes and/or heat maps, such as those described herein.

The resources 410 of the infrastructure may comprise any type and form of computing, network or IT resource. The resources 410 of the infrastructure may comprise any portion, component or element of an IT infrastructure. The resource may be any type and form of processors, CPU or core. The resource may be any type and form of memory. The resource may be any type and form of storage. The resource may be any component, portion or element of a network, including any type and form of network device, such as routers or connectivity such as a number of connections. The resource may be any type and form of computing time. The resource may be bandwidth of network allocation, availability or capacity. The resource may be quality of service of network. The resource may be storage allocation, availability or capacity. The resource may be memory allocation, availability or capacity.

A workload 425 may comprise any unit of executable(s) or executable instructions that may consume one or more resources or otherwise use a portion of the infrastructure 400. In some embodiments, a workload is an application. In some embodiments, a workload is a plurality of applications. In some embodiments, a workload is a service. In some embodiments, a workload is a plurality of services. In some embodiments, a workload is a process, task or thread. In some embodiments, a workload is a script. In some embodiments, a workload is a virtual machine. In some embodiments, a workload is a plurality of virtual machines. In some embodiments, a workload is a combination of one or more applications and one or more virtual machines. In some embodiments, a workload is one or more sets of executable instructions operating in a non-virtualized manner with one or more other sets of executable instructions operating in a virtualized manner. In some embodiments, a workload is selectable or designated by the user from anyone or more or combination of applications, virtual machines, processes, services, tasks, scripts, threads or other types and forms of executable instructions.

The normalized indexes 450 may comprise an index that measures a function of performance to cost of a workload's use or consumption of resources in the IT infrastructure. A normalized index may be determined or computed for a workload using any of the techniques described herein and further discussed below, such as the PPDI index. The index may be determined and normalized based on an average performance/cost curve, line or computation for all or a selected set of workloads across the infrastructure. The index may be determined and normalized based on a distance of a workload from the average performance/cost curve, line or computation for all or a selected set of workloads across the infrastructure. The index may be determined and normalized based on a ratio of performance to cost for one or more workloads across the infrastructure. The index may be normalized by fitting the performance/cost ratios or index of a selected set or all of the workloads in a range, such as a fixed size matrix. The normalized index may be computed using any interpolation, extrapolation and/or estimation techniques. The normalized index may be computed using any statistical techniques. The normalized index may also track other information and trends.

A normalized index may be determined or computed for a single workload. A normalized index may be determined or computed for a plurality of workloads. A normalized index may be determined or computed for all the workloads in infrastructure 400. A normalized index may be determined or computed for a user selected set of workloads. A normalized index may be determined or computed for a set of workloads in a business view or section of the IT infrastructure.

A heat map 460 may comprise any type and form of a graphical representation of data where the values taken by a variable in a multi-dimensional table are represented as colors and/or other visual indicators. A heat map 460 may comprise any type and form of a graphical representation of data that is used to compute the normalized indexes. The heat map 460 may provide a graphic representation of the normalized indexes 450A-450N of a plurality of workloads.

The heat map 460 may provide a graphic representation of a plurality of workloads. The heat map 460 may provide a graphic representation of the normalized indexes 450A-450N of a plurality of workloads and the plurality of workloads.

Figure 4C:
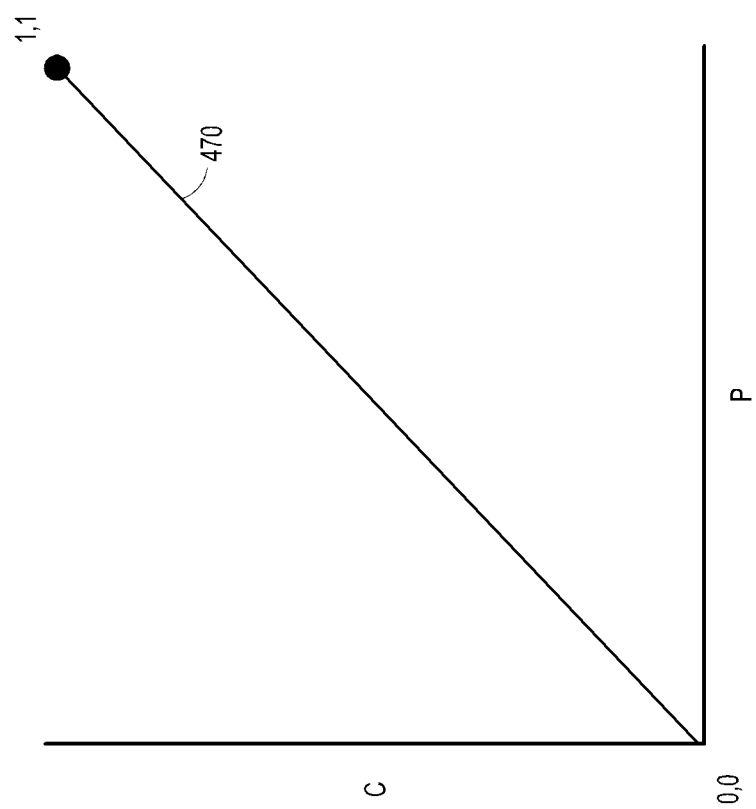
Figure 4D:
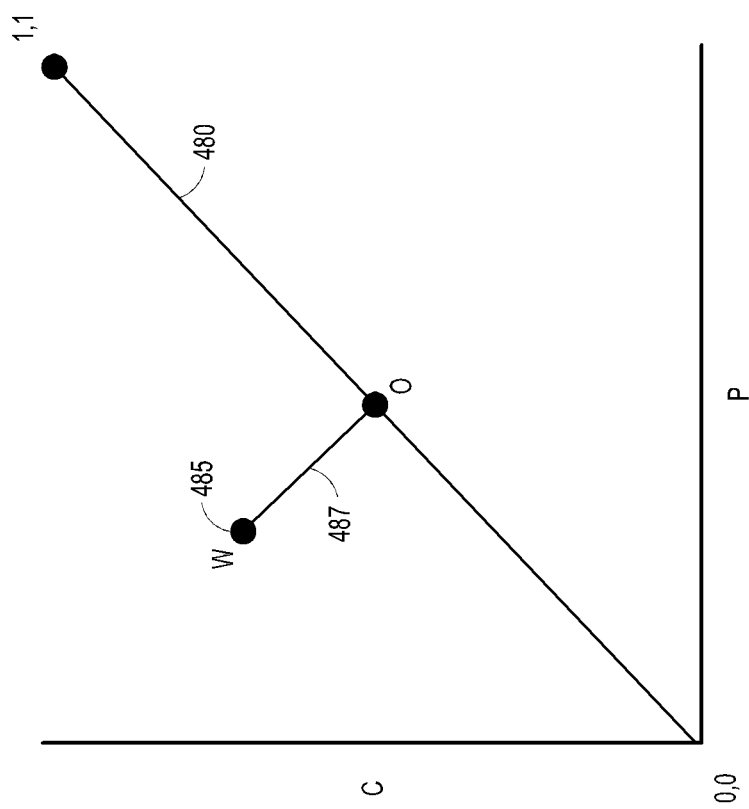

Referring now to FIGS. 4B to 4D, the underlying basis and concept for performance indexing of certain embodiments of the present disclosure is described. As a brief overview, given two equivalent workloads (e.g., a virtual machine running in an environment) running satisfactorily in two different parts of the environment with differing costs, it may not be very difficult to identify which of the two represents a better cost/performance balance. It is much more difficult, however, to look at hundreds or thousands of different workloads running on dozens or hundreds of different hardware configurations and to determine whether an optimal or even reasonably effective balance is being achieved. Various embodiments of the Price Performance Delta Index ("PPDI") of the present disclosure are designed to address this challenge. The specific resources that exist in an environment together with the actual performance and costs experienced by workloads running on those resources give rise to a kind of balanced price and/or performance curve. A balanced price and/or performance curve can be determined as the average price and/or performance behavior within the organization, but it can be interpreted as a way of determining whether the "right" price is being paid for a given level of performance within the context of the infrastructure available or whether the "right" performance is being achieved for the price paid.

Referring to FIG. 4B, an embodiment of the average price and/or performance behavior is depicted. If a specific workload 465 or the capabilities of a specific resource are represented as points on a graph together with the balanced price and/or performance curve 460, their deviations from the curve are a measure of the degree to which those particular workloads are "out of balance." At first glance, it may seem that only deviation in one direction is problematic. For instance, getting higher performance for a lower price may not seem bad. However, deviations in the other direction may also be problematic for several reasons. First, the ideal price and/or performance curve can represent an average of all workloads in the environment. If some workloads are getting a great deal (e.g., a large amount of resources for cost), some others are getting a worse deal. And if the average deviation is high, it means that there is no real relation between the performance workloads achieve and the price being paid. This seems worth investigating. Second, even if just a few workloads are getting higher performance than warranted by the cost, it should raise a question as to why more workloads cannot achieve this lower-priced performance. Finally, whether the deviations in the other direction are problematic depends on perspective. If the price represents the price paid by the organization for the resources used, falling below the average price and/or performance curve may be viewed as positive. However, if that same number represents the price an entity or Information Technology (IT) is charging business users, then the number represents that certain business users are effectively being subsidized by others or by IT itself.

As described, deviations from the balanced price and/or performance curve may be interesting for looking at what is going on in a particular organization at a particular time. However, such a curve may not provide a basis for comparison across different times or different organizations. One way to provide such a basis may be to transform the raw data into a form that is independent of specific workloads, hardware, etc.

FIG. 4C depicts an embodiment of an approach that first transforms the balanced price and/or performance line 470 into the diagonal of a 1×1 square that contains some or all of the individual workloads executing in a computing environment. The vertical axis represents price or cost of the resources used for executing workloads, and the horizontal axis represents performance of the workloads. The price-performance line 470 is schematically depicted as a straight line for convenience of illustration but may be shaped differently for other computing environments. The line 470 generally slopes upward since increased performance generally requires increased costs. In some embodiments, the balanced price and/or performance line 470 is transformed into the diagonal of a fixed square of size N×Nu. As further described herein, the balanced price and/or performance line 470 can represent the average price-performance of the workloads. In some cases, the price-performance line 470 may be referred to as a performance index. In FIG. 4D, a price-performance line index 480 is shown that is generally similar to the line 470 in FIG. 4C. The systems and methods herein can measure how far from "balance" (e.g., how far from the line 480) the actual price and/or performance is for a specific workload 485. The distance between the workload 485 and the price-performance line 480 may be referred to as the Price Performance Delta Index ("PPDI"). A workload that is in "balance", e.g., on the line 480 would have a PPDI of zero. A non-zero PPDI for a workload indicates the workload may be out of "balance" with respect to the cost/performance line 480. For a specific workload W 485, the perpendicular projection from W 485 to O 487 on the ideal cost/performance line 480 may be computed and used for the PPDI. The deviations of individual workloads 485 from the cost/performance line 480 (e.g., the distance between W and O) may be translated into the PPDI. For example, the PPDI for a workload may be scaled to have values between +100 and −100 (e.g., workloads above the line 480 have positive values, those below the line 480 have negative ones). In other embodiments, the PPDI can be determined differently, for example, as the vertical or horizontal distance of the workload 485 from the price-performance index or line 480.

There may be a number of ways to use the PPDI. In some embodiments, the PPDI is used to identify workloads that are not placed effectively so as to achieve overall better cost/performance balance across the organization. In some embodiments of the cost measure reflecting the price being paid by business users, the PPDI is used to identify business owners who may be unfairly subsidized by other departments. In some embodiments, the PPDI's average, median, standard deviation, range, etc. is used as a means of tracking the organization's effectiveness as a whole or to compare and benchmark individual departments or datacenters. In some embodiments, the PPDI is used to define tiers of service. Since the actual performance and cost values corresponding to points in the graph can be variable, a way to achieve this may be to select a benchmark actual performance value (or values, for multiple dimensions) and to define tiers relative to the benchmark, which can be translated to specific index values at any point. In some embodiments, the PPDI is used to identify workloads, such as VMs, that lie outside the tier assigned to them. This might be a workload or VM that is getting either more or less than its business owner is paying for.

The PPDI has been discussed generally in terms of measures of performance and cost. There may be different approaches to generating actual price and performance metrics for use within this PPDI framework. In some embodiments, a measure of workload performance may be the actual observed performance of the application the workload supports from an end-user perspective. In some embodiments, this information is used in this PPDI framework, while in other embodiments, when such information is not available, other approaches are used. In some embodiments, information on utilization of infrastructure resources like memory, CPU, and storage and network throughput related to the work accomplished by the application or workload may be used. For example, in some embodiments, the total CPU cycles used over a specified period as a measure of the performance that a given workload achieved. Similar measures may be found for each type of resource.

In some embodiments, the system 100 can make a correction when a workload encounters performance problems. For example, the system may make a correction for excessive waits for CPU, swapping, high latency, etc. Although the impact of those problems may be already accounted for in the basic metric (e.g., if the workload had not experienced high CPU Ready, the workload probably would have achieved more cycles than it did), the impact may not show up in the price and/or performance calculation if the price (as is likely) is based on utilization. In some embodiments, the system 100 adds or considers an additional penalty in performance when there is such a performance degradation. Performance problems may be determined based on the normalized performance index or the PPDI. For example, performance of a workload 485 may be considered "out of balance" if performance or cost of a workload 485 departs from an expected performance or cost based on the normalized performance index. For example, the distance 487 of the workload 485 from the average performance and/or cost curve or line 480 may be considered to determine the extent to which the workload 485 deviates from its expected performance or cost. The deviation of a workload 485 from the average performance-to-cost curve or line 480 can be above or below the curve or line 480. In some embodiments, if it is determined that the workload 485 performance deviates sufficiently from the average performance-to-cost curve or line 480, the resources that are allocated to the workloads 485 in the computing infrastructure may be reallocated, e.g., in order to make the distribution of the performance or cost of the workloads 485 closer to the average performance-to-cost line 480. The resources, such as CPU, memory, storage, and network, may be reallocated, e.g., in proportion to the deviation of a workload 485 from the ideal performance-to-cost line 480. Some or all of the workloads 485 may be moved to a different part of an IT infrastructure, e.g., a subsystem in the IT infrastructure. The workloads 485 may also be assigned to resources that are different from the resources currently allocated to the workloads 485.

These measures of work accomplished may provide an effective way to understand infrastructure-level cost/performance balance and may be useful for comparing different organizations. Even if using different metrics instead of equivalent metrics, the PPDI can remain useful as a basis for comparison. Furthermore, because the PPDI framework can be independent of the particular measures used for the PPDI, the systems and methods of the present disclosure can easily substitute improved or desired performance metrics as such metrics become available without redesigning the index.

In some embodiments, the PPDI framework computes the performance for CPU, memory, storage and network over a given interval time interval. The time interval may be any desired or set time period in terms of minutes, hours, days, weeks, months, quarters or years. In some embodiments, the interval is fixed at 7 days.

In embodiments of computing the CPU performance, the definition of compute performance over a given interval may the actual compute cycles used (e.g., CPU usage) minus a factor times the number of cycles that the workload (e.g., a VM or appliance) spent waiting (e.g., CPU Ready), such as the following computing:

$$CPU_{Usage} - F_{CPU} * CPU_{Ready}$$

In some embodiments, the final units from the computation is cycles. In some embodiments, the value of $F_{CPU}$ is set to a value, such as 1.0.

In embodiments of computing memory performance, the definition of memory performance may be the number of bytes (e.g., MB) consumed over the interval less a factor times the number of MB swapped, such as the following:

$$Memory_{consumed} - F_{Memory} * Memory_{Swapped}$$

In some embodiments, the final units from the computation is megabytes. In some embodiments, the value of $F_{Memory}$ is set to a value, such as 1.0.

In embodiments of computing storage performance, the definition of storage performance may be the actual bytes throughput multiplied by a ratio of target latency to actual latency. The target latency may be set to a value such 1 ms. In some embodiments, the target latency may set to a percentage of a warning level. The storage performance may be computed as follows:

$$Throughput * L_{target} / L_{actual}$$

In some embodiments, the final unit from the computation is MB/s. In some embodiments, the value of $L_{target}$ is set to a predetermined value.

In embodiments of computing network performance, the definition of network performance may be the actual bytes throughput. In some embodiments, no degradation factor is used, such as from dropped packets. In other embodiments, a degradation factor is used, such as for dropped packets). In some embodiments, the final unit for this computation is MB/s.

An aggregate performance metric may be computed, determined or identified from any combination of resource specific or based performance metrics. In some embodiments, the aggregate performance metric is based on a combination of the CPU performance metric with one or more of the memory, storage or network performance metric. In some embodiments, the aggregate performance metric is based on a combination of the memory performance metric with one or more of the CPU, storage or network performance metric. In some embodiments, the aggregate performance metric is based on a combination of the storage performance metric with one or more of the memory, CPU or network performance metric. In some embodiments, the aggregate performance metric is based on a combination of the network performance metric with one or more of the memory, storage or CPU performance metric. The aggregate performance metric may be based on any weighting and/or function of any of the performance metrics making up the aggregation.

In some embodiments, the PPDI is computed using a single metric that is a combination of all the measures (e.g., CPU, memory, storage and network) into a single aggregate performance metric. In some embodiments, the aggregation is done with a weighted average of the individual measures. The weights may be the relative costs associated with each performance dimension. For example, if a workload has a set of N costs $C_i$ and performance metrics $P_i$, an aggregate performance P and aggregate cost C are computed as follows:

$$P=\Sigma_i C_i P_i/(\Sigma_i C_i)$$

$$C=\Sigma_i C_i/N$$

In some embodiments, the cost used for the price and/or performance metric is the sum of the fixed, allocation and/or utilization costs computed using any type and form of chargeback models. In some embodiments, a price override, such as business view price override is used for chargeback. The override allows the user to charge for allocation, utilization or a combination on a per-resource basis.

In some embodiments, PPDI computation may be performed on different business views of the IT infrastructure. The system 150, such as any of those systems previously described in conjunction with FIGS. 1-3C, may provide for different views of the IT infrastructure. A business view may comprise an assignment of different workloads, applications or VM. A workload, application or VM may be in multiple views. In some embodiments, the PPDI may be computed for workloads of, assigned to or associated with a business view, a host, cluster or datacenter. For the selected set of VMs based on business view, host, cluster or datacenter the performance measures are computed and the chargeback report fixed, allocation and/or utilization costs for each resource. In some embodiments, the individual resource costs to compute the aggregate performance and add the costs to get a total price.

In some embodiments, as illustrated in FIG. 4D, given, for all workloads in an environment, measures of the performance achieved by that workload 485 (e.g., VM)(P) and the cost incurred (C) a set of price and performance values are determined and plotted on a two-dimensional grid, with performance mapped to the x-axis and price to the y-axis. The linear least-squares fit can be computed to the set of points. For example, assume the equation of the computed line is y=ax+b. In some embodiments, the computation is based on the typical case when a>0. In some embodiments, the computation may account for a≤0. In some embodiments, a value of a≤0 indicates a highly problematic environment in which increasing performance is obtained for free or even for less cost than lower performance. In some embodiments, the smallest rectangle that has the balanced cost/performance balance line as its diagonal and also contains all the points is determined. In some implementations, the index may, but need not be, normalized. For example, in some embodiments, the rectangle is normalized to become a 1×1 square. In some embodiments, the rectangle is normalized to a N×N square. In some embodiments, the rectangle is normalized to a X by Y rectangle.

In some embodiments, if the lower-left and upper-right corners of the new rectangle are denoted as $(N_x^0, N_y^0)$ and $(N_x^1, N_y^1)$, respectively, the optional normalization computation is as follows:

$$N_x^0=\text{Min}[P_{min},(C_{min}-b)/a]$$

$$N_y^0=\text{Min}[C_{min},aP_{min}+b]$$

$$N_x^1=\text{Max}[P_{max},(C_{max}-b)/a]$$

$$N_y^1=\text{Max}[C_{max},aP_{max}+b]$$

The price and performance values may be normalized as:

$$P'=(P-N_x^0)/(N_x^1-N_x^0)$$

$$C'=(C-N_y^0)/(N_y^1-N_y^0)$$

With the normalized price and/or performance line 480, the Price Performance Delta Index (PPDI) may be computed based on the perpendicular projection 487 onto the balanced cost/performance line 480, as shown in FIG. 4D. PPDI may be computed as the distance from W 485 to O, optionally normalized to lie in a range, such as +100 to −100, e.g., multiplied by 100/√2. In this example, the sign is + if the point W is above the line, − if below.

Figure 4E:
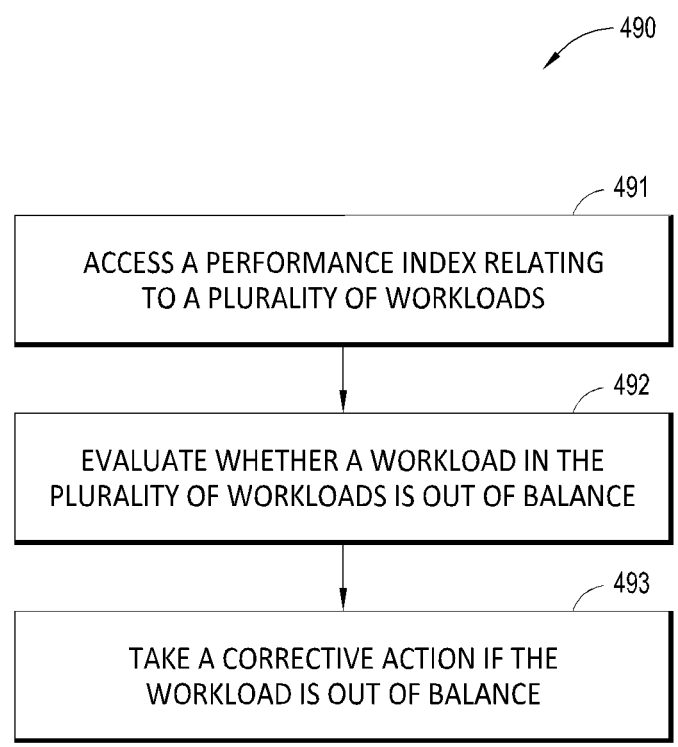
FIG. 4E is a flowchart illustrating an example method for indexing of performance and cost of workloads in a virtualized computing environment.

FIG. 4E is a flowchart illustrating an example method 490 for indexing of performance and cost of workloads in a computing environment. The computing environment may include a virtualized computing environment. The method 490 may be performed by, for example, the management system 100/200 as shown in FIG. 4A. At block 491, the method 490 accesses a performance index relating to a plurality of workloads executing in a computing environment. The performance index may be any of the performance indexes described herein. The performance index may be normalized. The performance index can be based at least in part on performance and cost of computing resources in the computing environment used by the plurality of workloads. At block 492, the method 490 evaluates whether a workload in the plurality of workloads is out of balance relative to the performance index. For example, the method 490 may calculate a PPDI for the workload (e.g., the PPDI 487). As described herein, a non-zero PPDI can indicate that the workload is out of balance with respect to the performance index (e.g., the line 470 or 480). At block 493, the method 490 takes a corrective action in response to an evaluation that the workload is out of balance, such that the performance or cost of the workload moves closer to balance based on the performance index.

Figure 5A:
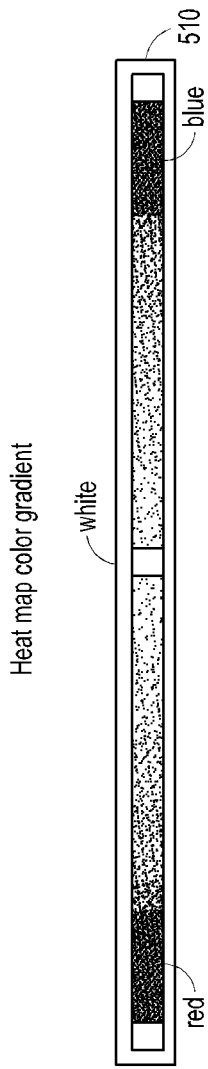
FIG. 5A is a diagram of an embodiment of a gradient slider for a heat map.
Figure 5B:
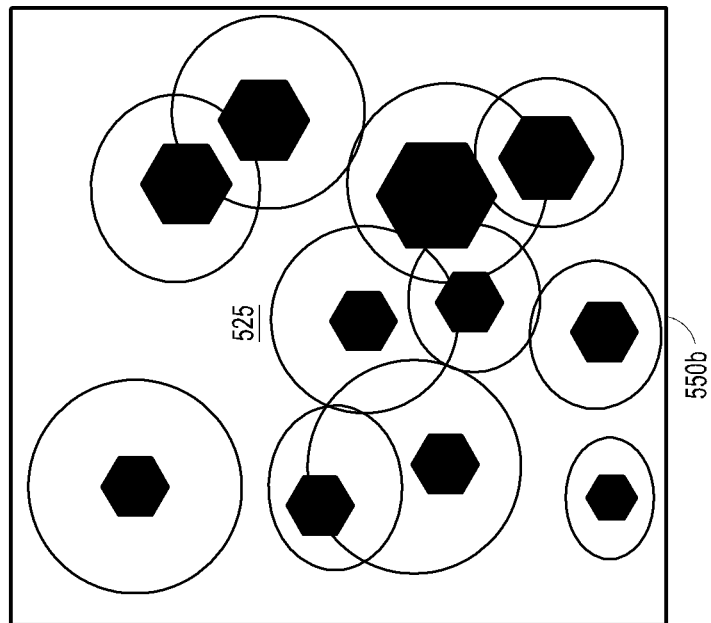
FIG. 5B is a diagram of embodiments of heat maps.
Figure 5B:
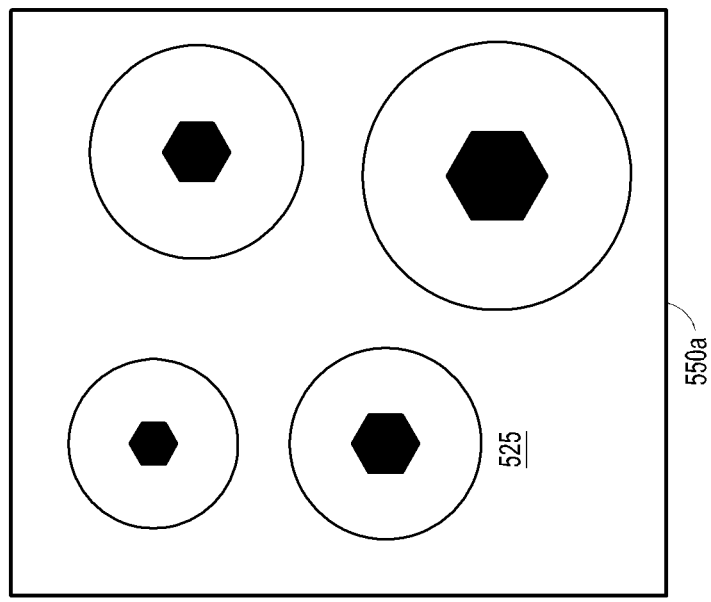

Now referring to FIGS. 5A and 5B, in some embodiments, the system 100 provides a user interface (UI) that can represent a heat map. The heat map may be associated with reporting and chargeback functionality. In some embodiments, the heat map is defined for performance, capacity and efficiency. In some embodiments, the heat mapping functionality provides a slider that allows a user to specify the color transitions, such as an embodiment of the slider 510 depicted in FIG. 5A. Such a slider supports different organizations' tolerance for deviation from ideal varies. The slider may be configurable to allow for a choice of color schemes. In some embodiments, 3-color gradient scheme may be used such as a red-white-blue one of the embodiment of FIG. 5A. In some embodiments, if one does a drill down for a single VM, the heat map may show the actual costs and performance metrics used.

In some embodiments, the heat map comprises a PPDI heat map. In some embodiments, the heat map comprises a Cost Index heat map. In some embodiments, the cost index heat map is based on values that represent the relative cost to the organization of each workload (e.g., VM) shown in the map. A primary driver for virtualization may be the need to make more effective use of expensive hardware resources. In the early phases, achieving significant improvements in cost was relatively easy. It was enough to consolidate non-critical workloads onto physical servers, with the cost effectiveness improving almost linearly with increased VM density. But as business-critical workloads are virtualized, requiring a more careful balance between capacity utilization and performance, it can become much more difficult to understand the real costs of specific workloads running in the virtual environment, and so becomes harder to determine whether benefits continue to be gained.

In some cases, the typical thinking about workload costs has tended to focus simply on allocating the amortized cost of hardware based on what particular workloads either use or are allocated to the resources. In these cases, this may give an incomplete picture. Referring to the example heat map in FIG. 5B, the two rectangles in this example represent two substantially identical server environments 550a and 550b. Each circle (or oval) represents a resource allocation for a VM running on the server, and the hexagon inside the circle represents the actual utilization of that resource. The hexagon/circle 525 represents one particular VM running in the two environments. The resource allocations and utilizations are substantially identical, and so the cost estimate for running that workload would be the same in both servers 550a, 550b based on traditional measures. However, this may be inaccurate because it may not reflect the true cost of the different environments. The workload 525 on the right is executing in a highly over allocated environment and running the workload there is clearly cheaper than running in the environment on the left. In other embodiments, the heat map can use graphical representations different from circles (or ovals) and hexagons to represent workloads or resource allocations.

Embodiments of the present disclosure can provide significant value for customers by allowing them to see these actual costs, and later by provide ways to test the alignment of those costs with the business value or priority of the workloads. The cost index map data to be presented in the heat map may comprise one or more of, or any combinations of, the following: name of the VM, VM unique identifier, host name, host unique identifier, cluster name, cluster unique identifier, datacenter name, cost index, or any other suitable information.

In some implementations, the cost index may include two parts: a corrected base cost (e.g., a cost corrected for the utilization of the server on which the VM is running) and a normalization that yields the cost index, which may be a real number between 1 and 100. In some embodiments, the costs are computed individually for each VM.

In some embodiments of the corrected base cost calculations, the total corrected base cost of a VM, $C_{vm}$ is computed as the sum of the corrected base costs $C_R$ for each resource (e.g., CPU, memory, storage, network) utilized by the VM, such as the following:

$$C_{vm}=C_{cpu}+C_{memory}+C_{storage}+C_{network}. \quad (1)$$

In some embodiments, the cost values are computed for a specified evaluation period T, which may be any desired or predetermined time period. In some embodiments, the default T may be 1 week.

In some embodiments, a factored approach may be used to compute the corrected base cost, such a factor $F_R$ multiplied by a base cost $B_R$. For example, the factored approach may comprise multiplying the base cost of each resource by a factor for that resource as follows:

$$C_{vm}=F_{cpu}*B_{cpu}+F_{memory}*B_{memory}+F_{storage}*B_{storage}+F_{network}*B_{network}. \quad (2)$$

In some embodiments, one or more factors may be set to correct only for server-based resources, such asset setting $F_{storage}=1$ and $F_{network}=1$. In some embodiments, the computation comprises multiplying a Factor F for each computation of B and performing an integral computation of each result. In some embodiments, the computation comprises taking an integral of the factor F for each B over an interval 0 to N.

In some embodiments, the calculation of $F_{cpu}$ and $F_{memory}$ is performed by selecting the host that the VM will be associated with for purposes of the calculation (e.g., the last host on which the VM ran, or the host on which it ran the most time. In some embodiments, the utilization $U_R$ for that resource (e.g., CPU or memory) on that host is computed. In some embodiments, this utilization $U_R$ is computed as a decimal value and in other embodiments, as a percentage. In some embodiments, the factor $F_R$ is computed as $1/U_R$. In some embodiments, if utilization value for server resource, such as memory or CPU, is missing or 0, then the corresponding factor F may be set to 1. As a result, in some embodiments, equation (2) now becomes:

$$C_{vm}=B_{cpu}/U_{cpu}+B_{memory}/U_{memory}+B_{storage}+B_{network}. \quad (2a)$$

where the values are computed for the evaluation period T. In some embodiments, there may be a control to set the evaluation period for the Cost Index.

In some embodiments, the base cost $B_R$ may be defined. The calculation of $B_R$ for each VM may depend on the selected node or business and whether or not a Chargeback price model override exists. In some embodiments, a Non-Business-View Node or VM without a pricing model override, the $B_R$ should be the utilization cost for R (resource) computed by Chargeback for that VM. In some embodiments, if VM in a Business View that overrides the pricing model, the $B_R$ should be the total cost (sum of utilization, allocation and fixed costs) computed for R by Chargeback for that VM.

In some embodiments for a normalized cost index, the absolute value of the corrected base cost may not be as meaningful as its real value in allowing the costs of workloads throughout the environment to be compared. This may be accomplished by the following normalization for the cost index $C'_{vm}$:

$$C'_{vm}=(C_{vm}-C_{min})/(C_{max}-C_{min}) \quad (3)$$

In some embodiments, there are multiple definitions of $C_{min}$ and $C_{max}$. In some embodiments, $C_{min}$ and $C_{max}$ may be the minimum and maximum values of $C_{vm}$ across the entire infrastructure. In some embodiments, $C_{min}$ and $C_{max}$ may be computed just for the VMs under the currently selected node or business view.

In view of the systems, methods and techniques described above, embodiments of the present disclosure may compute a normalized performance to cost index for any type and form of workload for any type and of resources across any type of infrastructure, including virtualized and non-virtualized environments. With the techniques above, any price numerator computation may be used and any cost denominator computation may be used. In some embodiments, the cost index portion of the ratio may use any type and form of cost analysis. In some embodiments, the price portion of the ratio may use any type and form of price analysis. The technique normalizes the price to cost analysis across an average price/cost line or curve for the workloads and the distance from one workload to such a normalized line provides an index of price/cost performance for that workload. As such, the techniques described herein can be adapted to and use different price and/or cost calculations and provide an effective price/cost index for a workload for an infrastructure based on the adaptation.

TERMINOLOGY

For purposes of illustration, certain aspects, advantages and novel features of various embodiments of the inventions have been described herein. It is to be understood that not necessarily all such advantages may be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure.

Depending on the embodiment, certain acts, events, or functions of any of the algorithms, methods, or processes described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, processes, methods, and algorithms described in connection with the embodiments disclosed herein can be implemented as electronic hardware, computer software, or combinations of both. To clearly illustrate this interchangeability of hardware and software, various illustrative components, blocks, modules, operations, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The blocks, operations, or steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, an optical disc (e.g., CD-ROM or DVD), or any other form of volatile or non-volatile computer-readable storage medium known in the art. A storage medium can be coupled to the processor such that the processor can read information from, and write information to, the storage medium. In one possible alternative, a non-transitory storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of sequential, or time-ordered language, such as "then", "next", "subsequently" and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system for normalized indexing of performance and cost of workloads in a virtualized computing environment, the computer system comprising:
   computer hardware including a computer processor; and
   a performance manager comprising instructions executable by the computer processor to cause the computer hardware to:

access information relating to actual performance of a plurality of workloads executing in a virtualized computing environment comprising one or more resources,
  wherein each of the plurality of workloads comprises at least one of an application, a service, a process, a task, a thread, a script, or a virtual machine, and
  wherein the one or more resources comprise allocation, availability, or capacity of at least one of CPU, memory, storage, or network;
generate a normalized performance index based on the actual performance of the plurality of workloads, wherein the normalized performance index is based at least in part on performance and cost of the one or more resources in the virtualized computing environment used by the plurality of workloads;
determine whether an actual performance and cost of a first workload in the plurality of workloads departs from an anticipated performance and cost based on the normalized performance index;
in response to a determination that the actual performance and cost of the first workload departs from the anticipated performance and cost, reallocate the one or more resources to the plurality of workloads in the virtualized computing environment such that the performance and cost of the first workload is closer to the anticipated performance and cost based on the normalized performance index;
wherein the normalized performance index is based at least in part on a ratio of the performance to the cost of the use of the one or more resources in the virtualized computing environment by the plurality of the workloads;
wherein the performance manager is further configured to provide a graphical representation of the normalized performance index or the plurality of workloads; and
wherein the graphical representation comprises a heat map.

2. The computer system of claim 1, wherein the normalized performance index is based at least in part on average cost and performance of at least some of the plurality of workloads executing in the computing environment.

3. The computer system of claim 1, wherein the performance manager is further configured to update the normalized performance index to reflect a change in the virtualized computing environment.

4. The computer system of claim 1, wherein the performance manager is further configured to determine tiers of service based on the normalized performance index.

5. The computer system of claim 4, wherein the performance manager is further configured to determine whether cost or performance of a workload in the plurality of workloads is outside a tier of service associated with the workload.

6. The computer system of claim 1, wherein the normalized performance index is based at least in part on chargeback models relating to the one or more resources or to the plurality of workloads.

7. A method for indexing of performance and cost of workloads in a virtualized computing environment, the method comprising:
under control of a performance management system comprising non-transitory data storage and physical computer processors:
  accessing information relating to actual performance of a plurality of workloads executing in a virtualized computing environment comprising computing resources;
  generating a performance index based on the actual performance of the plurality of workloads, wherein the performance index is based at least in part on performance and cost of the computing resources in the virtualized computing environment used by the plurality of workloads;
  normalizing the performance index;
  determining whether an actual performance and cost of a first workload in the plurality of workloads departs from an anticipated performance and cost based on the performance index;
  in response to a determination that the actual performance and cost of the first workload departs from the anticipated performance and cost, taking a corrective action such that the performance and cost of the first workload is closer to the anticipated performance and cost based on the performance index;
  wherein the normalized performance index is based at least in part on a ratio of the performance to the cost of the use of the one or more resources in the virtualized computing environment by the plurality of the workloads;
  wherein the performance management system is further configured to provide a graphical representation of the performance index or the plurality of workloads; and
  wherein the graphical representation comprises a heat map.

8. The method of claim 7, wherein each of the plurality of workloads comprises at least one of an application, a service, a process, a task, a thread, a script, or a virtual machine.

9. The method of claim 7, wherein the one or more resources comprise allocation, availability, or capacity of at least one of CPU, memory, storage, or network.

10. The method of claim 7, wherein the corrective action comprises reallocating the computing resources to the plurality of workloads in the virtualized computing environment.

11. The method of claim 7, wherein generating the performance index comprises calculating an average cost-performance relationship for at least some of the workloads executing in the virtualized computing environment.

12. The method of claim 7, wherein determining whether performance and cost of a first workload in the plurality of workloads departs from an expected performance and cost based on the performance index is determined by calculating a difference between the performance and cost of the first workload and the expected performance and cost based on the performance index.

13. Non-transitory computer storage having stored thereon instructions that, when executed by a computer system having computer storage, cause the computer system to perform operations comprising:
  accessing a normalized performance index relating to actual performance of a plurality of workloads executing in a computing environment, wherein the performance index is based at least in part on performance and cost of computing resources in the computing environment used by the plurality of workloads;
  evaluating whether an actual performance of a first workload in the plurality of workloads is out of balance from an anticipated performance based on the normalized performance index;

in response to an evaluation that the actual performance of the first workload is out of balance from the anticipated performance, taking a corrective action such that the performance and cost of the first workload moves closer to the anticipated performance based on the normalized performance index;

wherein the normalized performance index is based at least in part on a ratio of the performance to the cost of the use of the one or more resources in the virtualized computing environment by the plurality of the workloads;

wherein the performance manager is further configured to provide a graphical representation of the normalized performance index or the plurality of workloads; and wherein the graphical representation comprises a heat map.

14. The non-transitory computer storage of claim 13, further comprising updating the performance index to reflect a change in the resources or workloads in the computing environment.

15. The non-transitory computer storage of claim 13, wherein evaluating whether the first workload in the plurality of workloads is out of balance relative to the performance index comprises calculating a price performance delta index (PPDI).

* * * * *